(12) United States Patent
Ito

(10) Patent No.: US 10,911,634 B2
(45) Date of Patent: Feb. 2, 2021

(54) IMAGE FORMING APPARATUS

(71) Applicant: CANON KABUSHIKI KAISHA, Tokyo (JP)

(72) Inventor: Nobuyasu Ito, Abiko (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/711,276

(22) Filed: Dec. 11, 2019

(65) Prior Publication Data
US 2020/0213468 A1 Jul. 2, 2020

(30) Foreign Application Priority Data
Dec. 26, 2018 (JP) .................. 2018-242854

(51) Int. Cl.
H04N 1/32 (2006.01)
H04N 1/00 (2006.01)

(52) U.S. Cl.
CPC ....... *H04N 1/32358* (2013.01); *H04N 1/0005* (2013.01); *H04N 1/0009* (2013.01); *H04N 1/00034* (2013.01); *H04N 1/00082* (2013.01)

(58) Field of Classification Search
None
See application file for complete search history.

(56) References Cited

U.S. PATENT DOCUMENTS

| 2008/0198718 A1* | 8/2008 | Hosokawa | G11B 7/0045 369/53.31 |
| 2009/0080019 A1* | 3/2009 | Teshima | H04N 1/2346 358/1.15 |
| 2018/0086101 A1* | 3/2018 | Uematsu | B41J 2/325 |

FOREIGN PATENT DOCUMENTS

JP 2011-103147 A 5/2011

* cited by examiner

Primary Examiner — Frantz Bataille
(74) Attorney, Agent, or Firm — Canon U.S.A., Inc. IP Division

(57) ABSTRACT

An image forming apparatus includes a first storage unit having a semiconductor memory, a second storage unit, an acquisition unit that acquires temperature information indicating a temperature in the first storage unit, a comparison unit that compares the temperature information acquired by the acquisition unit with a threshold, and a control unit. Based on the temperature information indicating a temperature below the threshold, the control unit causes the first storage unit to store data. Based on the temperature information indicating a temperature at or above the threshold, the control unit causes the second storage unit to store data without causing the first storage unit to store the data.

12 Claims, 7 Drawing Sheets

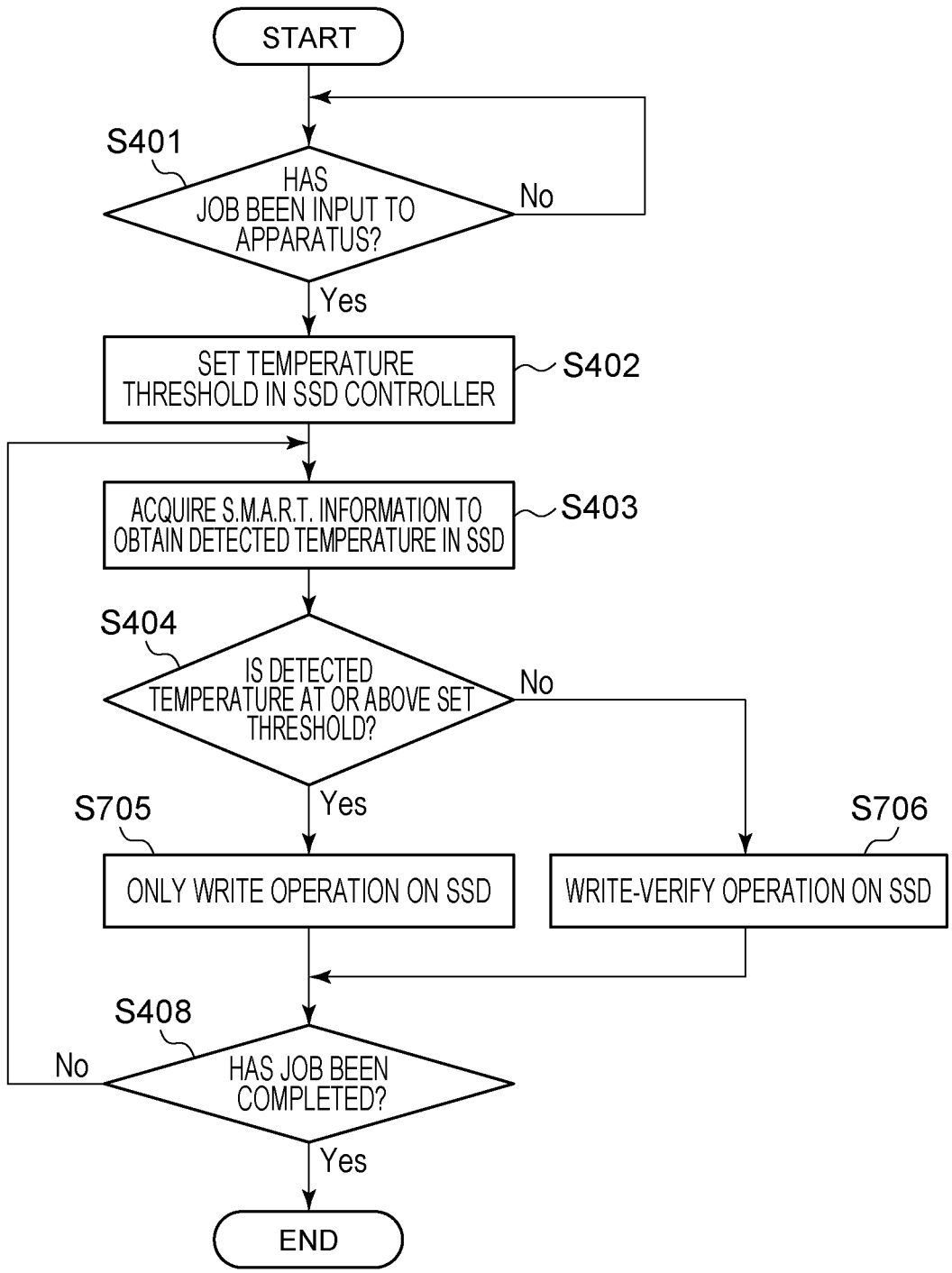

IMAGE FORMING APPARATUS

BACKGROUND

Field

The present disclosure relates to an image forming apparatus.

Description of the Related Art

An increasing number of apparatuses incorporate solid-state drives (SSDs) instead of hard disk drives (HDDs). Incorporating an SSD instead of an HDD allows an apparatus to be downsized. This promotes miniaturization of apparatuses.

For a storage area of the SSD, finer memory-device wiring lines lead to an increase in storage capacity per unit area of such a memory device. However, an increase in performance of the SSD causes an increase in power consumption.

This results in an increase in amount of heat per unit area that is generated during operation of the SSD. Unfortunately, heat may destroy data stored in the storage area of the SSD. If the data destroyed by heat is system data, the apparatus incorporating the SSD may stop operating due to a system failure. To prevent such an accident, the following measure is taken. A temperature sensor is disposed in the SSD to monitor a temperature, and a controller in the SSD controls access to the storage area to prevent an increase in temperature in the SSD. This measure is called thermal throttling.

Japanese Patent Laid-Open No. 2011-103147 describes an SSD including a temperature sensor like that described above. As described in Japanese Patent Laid-Open No. 2011-103147, the temperature sensor is disposed adjacent to memories. A memory controller controls access to data stored in the memories based on a temperature detected by the temperature sensor.

SUMMARY

According to an aspect of the present disclosure, an image forming apparatus includes a first storage unit having a semiconductor memory, a second storage unit different from the first storage unit, an acquisition unit configured to acquire temperature information indicating a temperature in the first storage unit, a comparison unit configured to compare the temperature information acquired by the acquisition unit with a threshold, and a control unit configured to cause, based on the temperature information indicating a temperature below the threshold, the first storage unit to store data and to cause, based on the temperature information indicating a temperature at or above the threshold, the second storage unit to store data without causing the first storage unit to store the data.

Further features of the present disclosure will become apparent from the following description of exemplary embodiments with reference to the attached drawings.

BRIEF DESCRIPTION OF THE DRAWINGS

FIG. 7 is a flowchart illustrating a process.

DESCRIPTION OF THE EMBODIMENTS

Exemplary embodiments of the present disclosure will be described in detail with reference to the attached drawings. The following embodiments are not intended to limit the present disclosure described in the appended claims. All of the combinations of features described in the embodiments are not necessary for solving issues in accordance with an embodiment of the present disclosure. In the following embodiments, an image forming apparatus will be described as an example of an information processing apparatus.

First Embodiment

Figure 1:
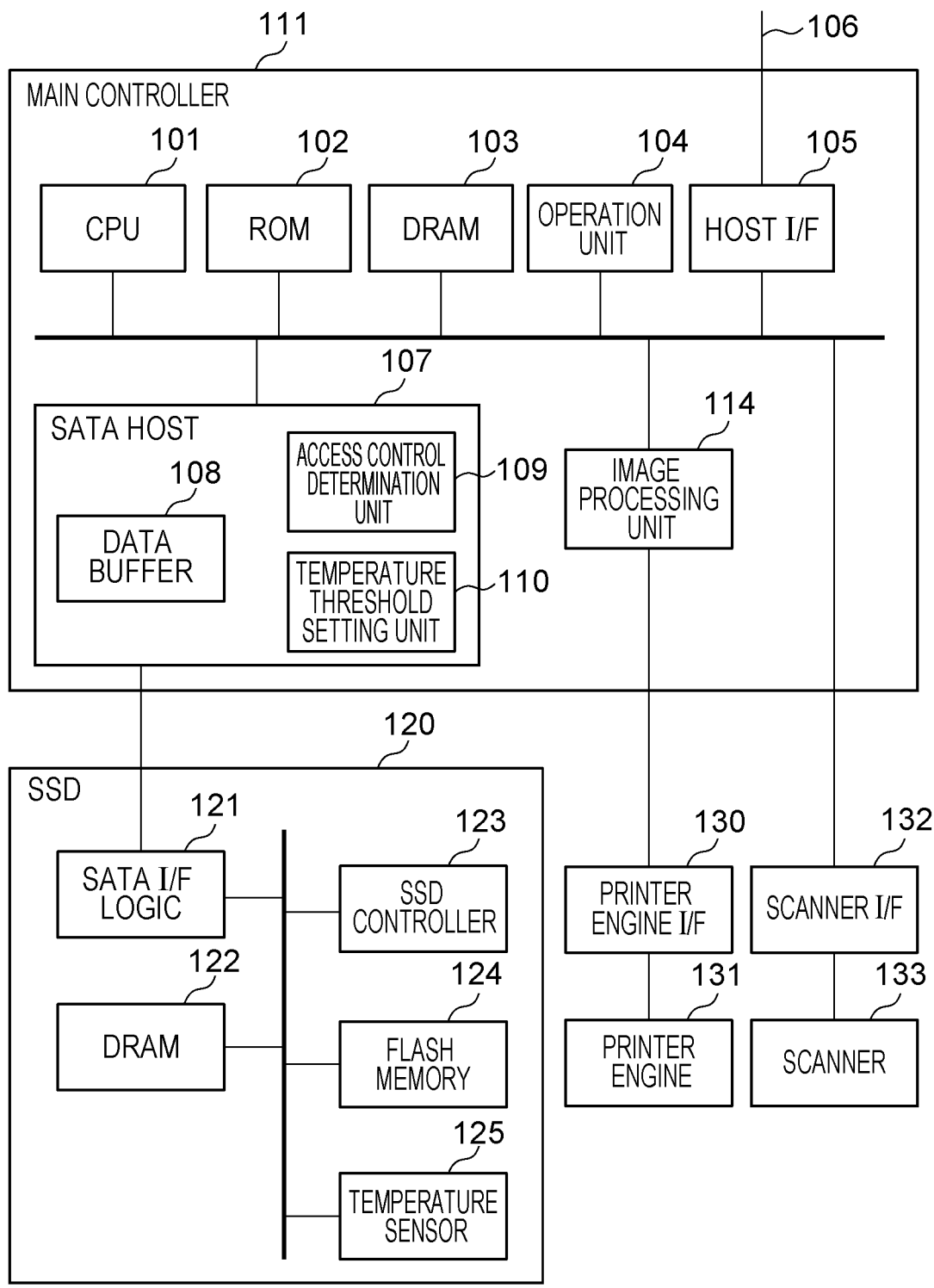
FIG. 1 is a block diagram of an image forming apparatus.

FIG. 1 is a block diagram illustrating an exemplary configuration of an image forming apparatus according to a first embodiment of the present disclosure.

A main controller 111 includes a central processing unit (CPU) 101, a read-only memory (ROM) 102, a dynamic random access memory (DRAM) 103, a serial AT attachment (SATA) host 107, a host interface (I/F) 105, and an image processing unit 114. These components are connected by an internal bus.

The CPU 101 is a microcomputer controlling the image forming apparatus. The ROM 102, which stores control programs for the image forming apparatus, is used when the apparatus is activated.

The DRAM 103 is a memory for storing programs that are executed by the CPU 101 and is also used as a work memory for temporarily storing data that the CPU 101 uses for arithmetic processing.

The image processing unit 114 is a module that performs various image processing operations, such as color correction on print data, gray level correction, text edge smoothing, and halftone processing.

A printer engine 131 prints an image on a sheet based on image data input through a printer engine I/F 130. A scanner 133 reads a document to generate image data and inputs the image data to the DRAM 103 through a scanner I/F 132.

An operation unit 104 includes a touch panel screen on which an operator inputs a command, and displays status information concerning the image forming apparatus and various setting items on the screen. Information received by the operation unit 104 is transmitted to the CPU 101 through an operation-unit I/F (not illustrated). The host I/F 105 is an interface through which data is transmitted to and received from an external apparatus (not illustrated) or a host personal computer (PC) via a local area network line 106 connected to the outside of the apparatus.

The SATA host 107, which is a host controller controlling an SSD 120, includes a data buffer 108, an access control determination unit 109, and a temperature threshold setting unit 110. The data buffer 108 is a buffer memory for temporarily storing data when the SSD 120 is accessed. The access control determination unit 109 is a controller that determines how to control data write and read operations on the SSD 120. The temperature threshold setting unit 110 is a controller that holds a temperature threshold, serving as a branch point at which the access control determination unit 109 changes the way of control.

The SSD 120 is a storage for storing, for example, software for controlling the image forming apparatus, various settings, saved documents, and data processed by the CPU 101 and for temporarily storing, or spooling, image data.

The SSD 120 includes SATA I/F logic 121, an SSD controller 123, a DRAM 122, a flash memory 124, and a temperature sensor 125.

The SATA I/F logic 121 is an interface circuit for communication with the SATA host 107. The SSD controller 123 is a main controller in the SSD. The DRAM 122, which is a cache memory of the SSD 120, temporarily holds data when the data is written to the SSD. The flash memory 124 is a semiconductor memory, to which data in the DRAM 122 is written in response to an instruction from the SSD controller 123. The temperature sensor 125 detects a temperature inside the SSD 120. The SATA host 107 can monitor the temperature.

Figure 2:
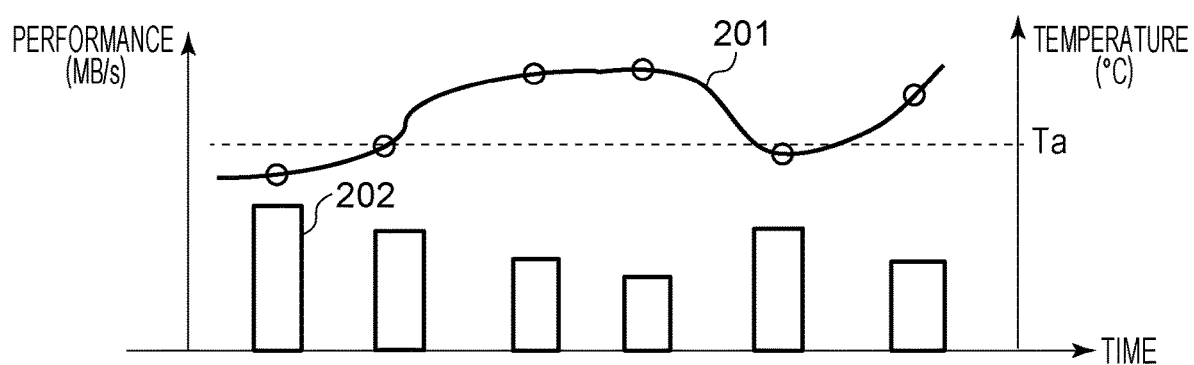
FIG. 2 is a graph illustrating a relationship between performance of an SSD and a change in temperature associated with access to the SSD.

FIG. 2 is a graph illustrating a relationship between performance of the SSD and a change in temperature inside the SSD associated with by access to the SSD.

The horizontal axis represents time, and the right vertical axis represents a temperature detected by the temperature sensor 125 in the SSD 120. A curve 201 represents a relationship between the time and the temperature.

The left vertical axis represents the performance, or a data processing rate at which the SATA host 107 writes or reads data. Bars 202 represent a relationship between the time and the performance.

The temperature in the SSD 120 increases over time as the frequency of access to the SSD 120 increases.

When the temperature detected by the temperature sensor 125 exceeds a threshold Ta, the SSD controller 123 turns on a thermal throttling function. The thermal throttling function limits access to the SSD 120, so that the performance of the SSD 120 begins to decrease.

The decrease of the performance reduces the frequency of access to the flash memory 124, providing a gradual reduction in temperature detected by the temperature sensor 125 in the SSD 120. When the temperature detected by the temperature sensor 125 is below the threshold Ta, the thermal throttling function is turned off. Thus, the frequency of access to the flash memory 124 increases.

Consequently, the temperature detected by the temperature sensor 125 again increases over time. As described above, the SSD controller 123 performs control to repeatedly turn on or off the thermal throttling function based on a temperature detected by the temperature sensor 125.

Figure 3:
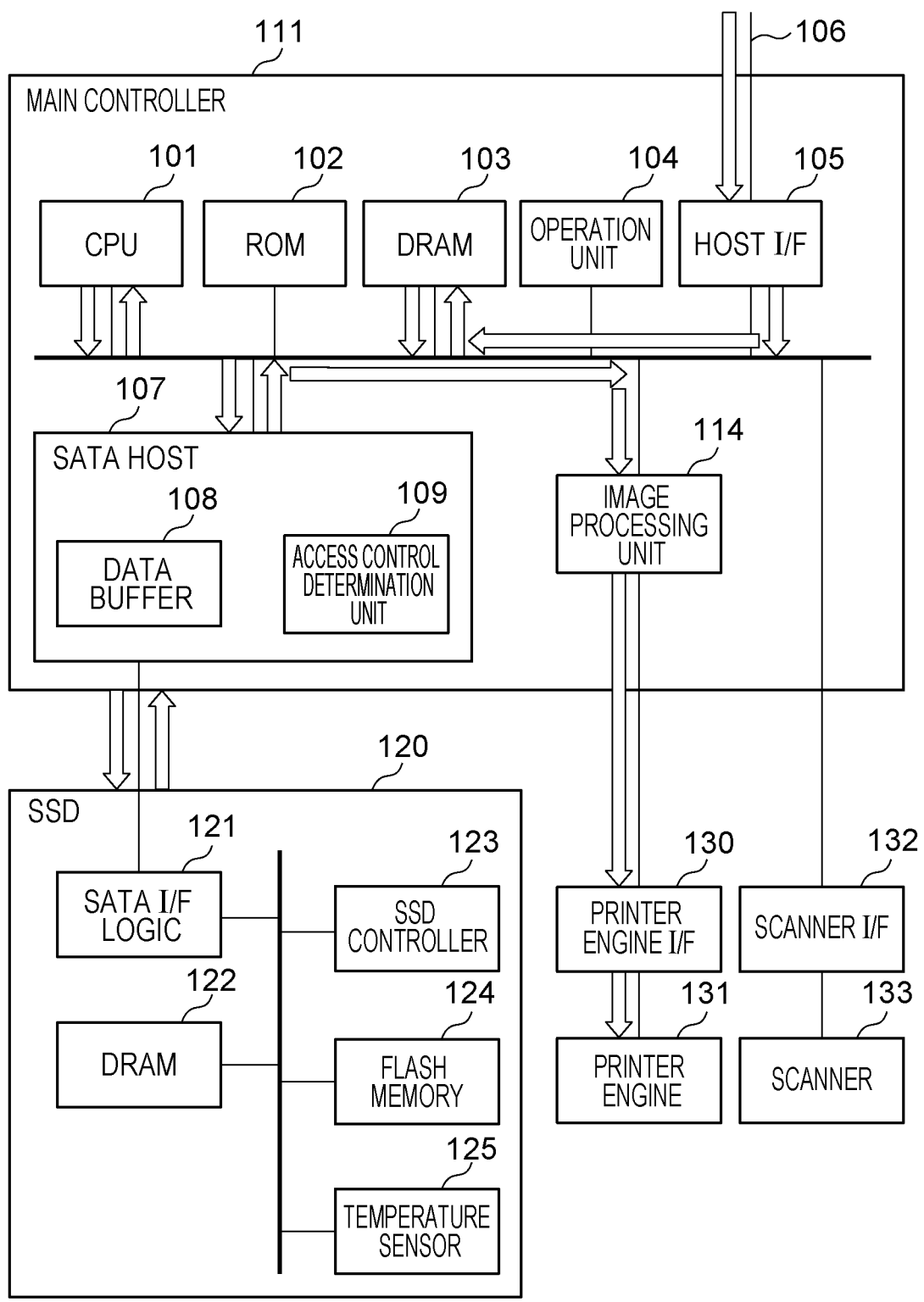
FIG. 3 is a diagram illustrating a path through which data is temporarily stored, or spooled.

FIG. 3 illustrates an exemplary data flow in the image forming apparatus, which performs printing in response to receiving a job from the host PC.

When receiving a print request from an external apparatus (not illustrated), for example, the PC, the CPU 101 receives print data in a page description language (PDL) format from the external apparatus through the host I/F 105 and stores the data into the flash memory 124 in the SSD 120 through the SATA host 107.

Upon receiving print data of one page from the external apparatus, the CPU 101 reads the data stored in the flash memory 124. The CPU 101 develops the read data into bitmap data in the DRAM 103 using a rendering program, stored in the ROM 102, for converting data in the PDL format into bitmap data. At this time, the CPU 101 develops the data in the PDL format into bitmap data in units of bands, into which one page is divided, and writes the bitmap data to the DRAM 103 because the amount of bitmap data converted from data of one page in the PDL format at a time is large.

When bitmap data of one band is stored in the DRAM 103, the CPU 101 reads the bitmap data from the DRAM 103 and stores the data into the flash memory 124 in the SSD 120 through the SATA host 107. The CPU 101 repeats the above-described process until developing data of the last band of one page is completed.

At completion of the development of print data of one page into bitmap data, the CPU 101 reads the bitmap data from the flash memory 124 and transfers the data to the image processing unit 114. The image processing unit 114 performs various image processing operations, such as text edge smoothing and halftone processing, on the bitmap data and then transmits the resultant data to the printer engine 131 through the printer engine I/F 130. The CPU 101 repeats the above-described process on a page-by-page basis until processing bitmap data converted from print data of the last page is completed.

Figure 4:
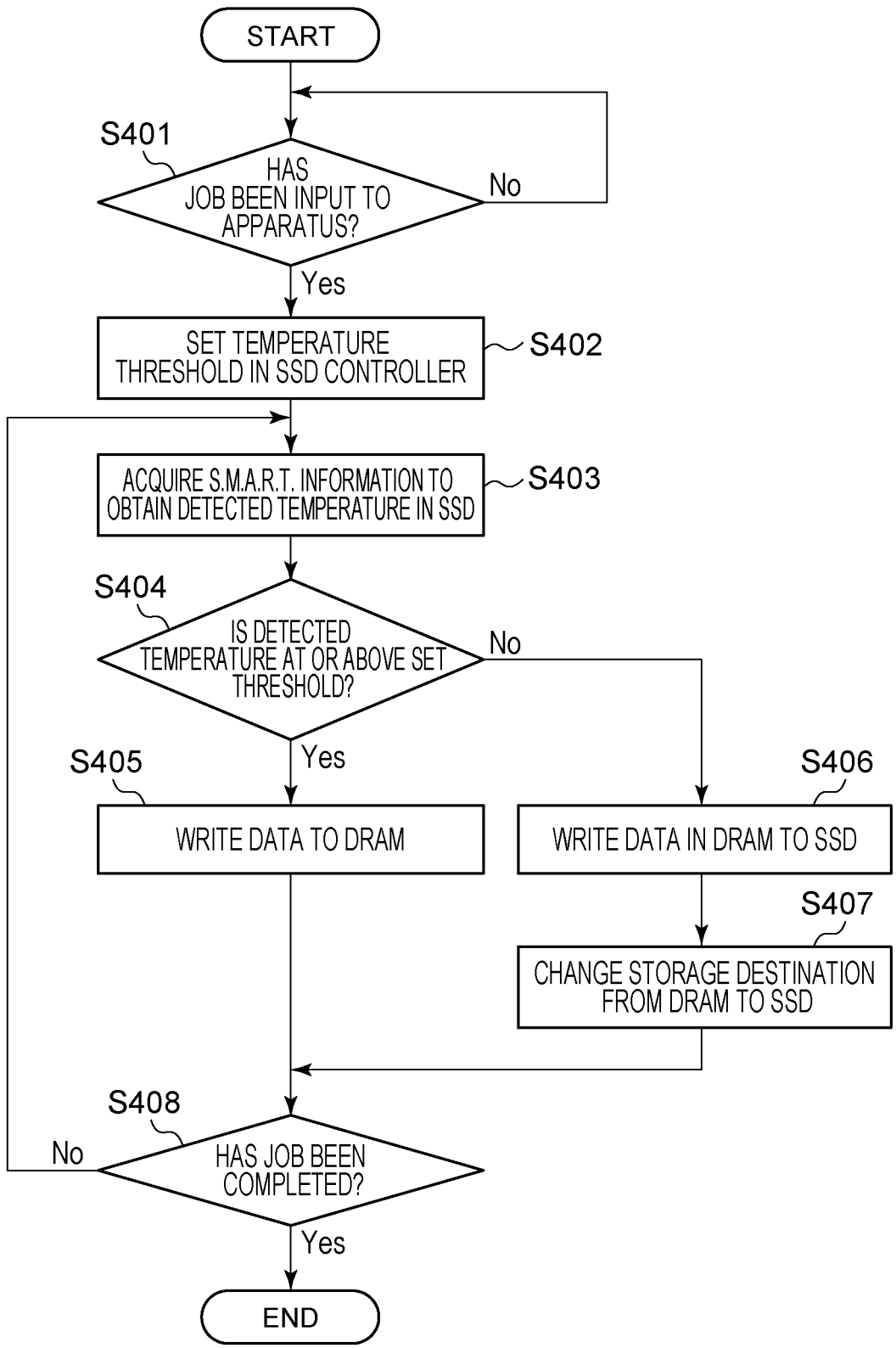
FIG. 4 is a flowchart illustrating a process.

FIG. 4 is a flowchart illustrating an exemplary control process in the embodiment. In FIG. 4, a way of access is changed based on a temperature in the SSD to prevent a reduction in performance of the SSD.

In step S401, the CPU 101 determines whether a job has been input to the image forming apparatus from the external apparatus (not illustrated). If any job has not been input, the process returns to step S401. If a job has been input, the process proceeds to step S402.

In step S402, the CPU 101 sets a threshold. The set threshold is to be compared with a temperature detected in step S403, which will be described later. This threshold is set to a value lower than the threshold based on which the thermal throttling function of the SSD 120 is turned on or off. Then, the process proceeds to step S403.

In step S403, the CPU 101 acquires self-monitoring, analysis and reporting technology (S.M.A.R.T.) information from the SSD 120 to obtain temperature information indicating a temperature detected by the temperature sensor 125. Then, the process proceeds to step S404.

In step S404, the CPU 101 compares the temperature detected by the temperature sensor 125 with the threshold. The CPU 101 causes, based on a comparison result, the access control determination unit 109 in the SATA host 107 to control access to the SSD. If the temperature is at or above the threshold, the process proceeds to step S405.

In step S405, the CPU 101 temporarily stores data into the DRAM 103. Then, the CPU 101 changes the storage destination from the SSD 120 to the DRAM 103. At this time, access to the SSD 120 can be avoided. Data of the job is written on, for example, the page-by-page basis. Then, the process proceeds to step S408. In the following description, for example, it is assumed that data is written on the page-by-page basis. Data may be written on, for example, a band-by-band basis or a job-by-job basis.

In step S408, the CPU 101 determines whether the job has been completed. If the job has not been completed, the process returns to step S403, where the temperature in the SSD is detected to write data of the next page. If the job has been completed, the process terminates.

Referring again to step S404, if the detected temperature is below the threshold, the process proceeds to step S406. It is assumed herein that data of the next page is to be written under conditions where data of the preceding page has been written in the DRAM 103.

In step S406, the CPU 101 writes the data written in the DRAM 103 to the SSD 120. Furthermore, the CPU 101 writes the data of the next page to the SSD 120. The data of the next page may be written directly to the SSD 120 or may be written to the DRAM 103 and then to the SSD 120. Then, the process proceeds to step S407. In step S407, the CPU 101 changes the destination, to which data is spooled, from the DRAM 103 to the SSD 120. Then, the process proceeds to step S408. Further description of step S408 is omitted because it has been described above.

The job in the embodiment is a job related to image formation, such as a print job, a scan job, or a box job.

Figure 5:
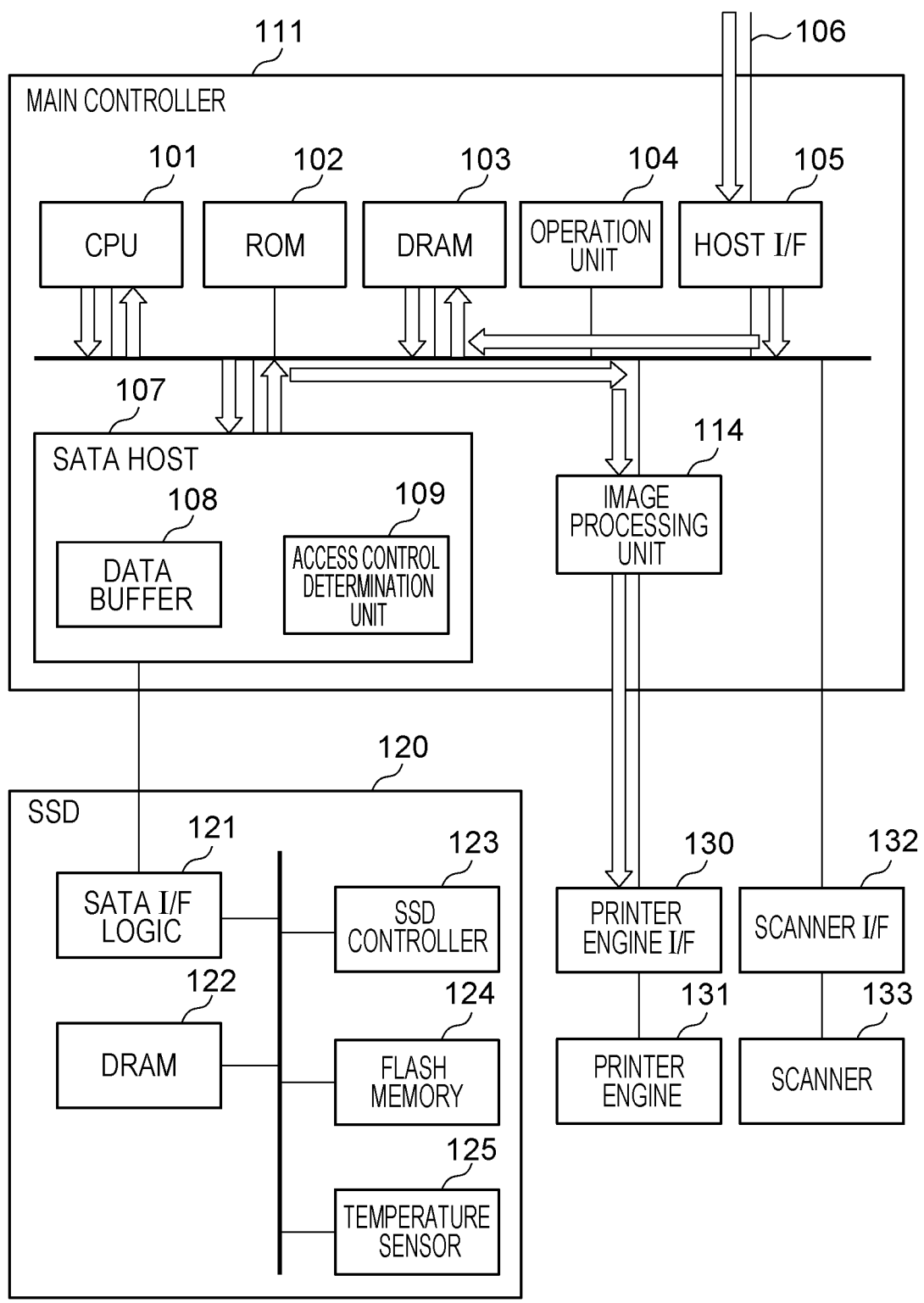
FIG. 5 is a diagram illustrating a path through which data is spooled.

FIG. 5 is a diagram illustrating an exemplary data flow in the image forming apparatus, which performs printing in step S405 in FIG. 4 in response to receiving the job from the host PC.

The data flow of FIG. 5 differs from the data flow of FIG. 3 in that the CPU 101 writes and reads data to and from the DRAM 103 without access to the SSD 120.

When receiving a print request from the external apparatus (not illustrated), the CPU 101 receives print data in the PDL format through the host I/F 105 and stores the data into the DRAM 103.

Upon receiving print data of one page, the CPU 101 reads the data stored in the DRAM 103. The CPU 101 develops the read data into bitmap data in the DRAM 103 using the rendering program, stored in the ROM 102, for converting data in the PDL format into bitmap data. At this time, the CPU 101 writes the data to the DRAM 103 in units of bands into which one page is divided. The CPU 101 repeats the above-described process until developing data of the last band of one page is completed.

At the completion of the development of print data of one page into bitmap data, the CPU 101 reads the bitmap data from the DRAM 103 and transfers the data to the image processing unit 114.

The image processing unit 114 performs various image processing operations, such as text edge smoothing and halftone processing, on the bitmap data and then transmits the resultant data to the printer engine 131 through the printer engine I/F 130. The CPU 101 repeats the above-described process on the page-by-page basis until processing bitmap data converted from print data of the last page is completed.

Figure 6:
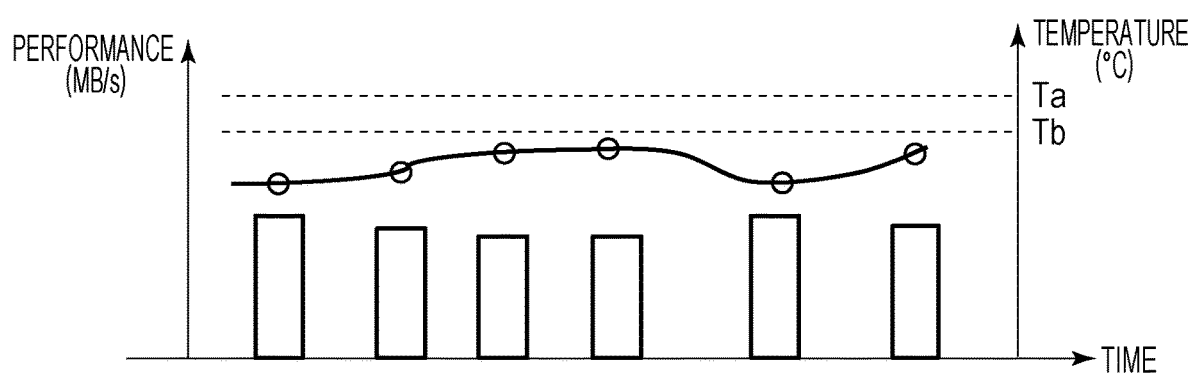
FIG. 6 is a graph illustrating a relationship between the performance of the SSD and a change in temperature associated with access to the SSD.

FIG. 6 is a graph illustrating a relationship between the performance of the SSD and a change in temperature in the SSD associated with access to the SSD in the embodiment.

Referring to FIG. 6, a threshold Tb is the threshold set in step S402 in FIG. 4. The threshold Tb is set at a temperature lower than the threshold Ta, based on which the thermal throttling function of the SSD 120 is turned on.

Specifically, the temperature in the SSD 120 increases as the frequency of access to the SSD 120 increases. The CPU 101 reduces the access to the SSD 120 before the thermal throttling function of the SSD 120 is turned on, thus suppressing an increase in temperature in the SSD 120. Furthermore, the CPU 101 causes the DRAM 103 to spool data when reducing the access to the SSD 120. This suppresses a reduction in performance.

With the above-described configuration, the image forming apparatus according to the embodiment achieves control to suppress an increase in amount of heat generated from a device while suppressing a reduction in performance of the apparatus.

In the above-described configuration in the embodiment, only writing (write operation) is performed on the SSD 120 and the DRAM 103. The SSD 120 may be subjected to verifying (write-verify operation). The write-verify operation is control that the SSD controller 123 performs to ensure that data is correctly written in the SSD 120. Specifically, the write-verify operation is performed in such a manner that the write operation is performed to write data and the written data is read to determine whether the data has been correctly written.

Second Embodiment

The image forming apparatus according to the first embodiment changes the path through which data is spooled, whereas an image forming apparatus according to a second embodiment changes the way of controlling access to the SSD 120. In FIG. 7, the same steps as those in FIG. 4 are designated by the same reference signs to avoid redundant description. In addition, the same description of FIGS. 1 to 3 and 6 as that in the first embodiment applies to the second embodiment and redundant description is avoided.

FIG. 7 is a flowchart illustrating a control process in the second embodiment. In the process of FIG. 7, whether to perform the write-verify operation is determined based on a temperature in the SSD. The write-verify operation, which is performed to ensure that data is correctly written as described above, can increase reliability of the apparatus. In this operation, however, the temperature in the SSD 120 tends to rise because the frequency of access to the flash memory 124 is higher than that in only writing (write operation). In this embodiment, whether to perform the write-verify operation or only the write operation is determined based on the temperature in the SSD.

In step S404, the CPU 101 determines whether the temperature in the SSD 120 is at or above the temperature threshold. If the temperature in the SSD 120 is at or above the threshold, the process proceeds to step S705.

In step S705, the CPU 101 allows the SSD controller 123 to perform the write operation. Specifically, the CPU 101 causes the SATA host 107 to transmit a write command to the SSD controller 123. Then, the process proceeds to step S408.

If the temperature in the SSD 120 is below the temperature threshold, the process proceeds to step S706, where the CPU 101 allows the SSD controller 123 to perform the write-verify operation. Specifically, the CPU 101 causes the SATA host 107 to transmit a verify command to the SSD controller 123. Then, the process proceeds to step S408.

In such a configuration, the frequency of access to the flash memory 124 in the SSD 120 is lower than that in a configuration in which the SSD 120 is always subjected to the write-verify operation. This can suppress an increase in temperature in the SSD 120.

With the above-described configuration, the image forming apparatus according to the embodiment achieves control to suppress an increase in amount of heat generated from a device while suppressing a reduction in performance of the apparatus.

In each of the first and second embodiments, the control is performed in the case where the temperature in the SSD 120 is at or above the threshold, reducing the frequency of access to the SSD 120. Consequently, the temperature in the SSD 120 gradually decreases and reaches below the set threshold. When the temperature in the SSD 120 is below the threshold, normal control is performed. Thus, the image forming apparatus achieves control to suppress an increase in amount of heat generated from a device while suppressing a reduction in performance of the apparatus.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-242854 filed Dec. 26, 2018, which is hereby incorporated by reference herein in its entirety.

What is claimed is:

1. An image forming apparatus comprising:
a nonvolatile semiconductor memory device including a sensor configured to acquire temperature information about an inside, compare the temperature information acquired by the sensor with a first threshold, and limit access in a case where the acquired temperature information exceeds the first threshold;
a memory device different from the nonvolatile semiconductor memory device;
a printer configured to print an image on a sheet based on print data; and
a controller having one or more processors which execute instructions stored in one or more memories, the controller being configured to:
acquire the temperature information from the nonvolatile semiconductor memory device;
compare the acquired temperature information with a second threshold lower than the first threshold;
cause, based on the temperature information below the second threshold, the nonvolatile semiconductor memory device to store print data and to cause, based on the print data stored in the nonvolatile semiconductor memory device, the printer to perform printing; and
cause, based on the temperature information at or above the second threshold, the nonvolatile semiconductor memory device not to store print data, cause the memory device different from the nonvolatile semiconductor memory device to store print data, and cause the printer to perform printing based on the print data stored in the memory device different from the nonvolatile semiconductor memory device.

2. The apparatus according to claim 1, wherein the controller causes, based on the acquired temperature information below the second threshold, the memory device different from the nonvolatile semiconductor memory device to temporarily store print data, reads the print data stored in the memory device different from the nonvolatile semiconductor memory device, and causes the nonvolatile semiconductor memory device to store the read print data.

3. The apparatus according to claim 1, wherein when causing the nonvolatile semiconductor memory device to store print data, the controller causes a write-verify operation to be performed on the nonvolatile semiconductor memory device, and when causing the memory device different from the nonvolatile semiconductor memory device to store print data, the controller causes only a write operation to be performed on the memory device different from the nonvolatile semiconductor memory device.

4. The apparatus according to claim 1, wherein the memory device different from the nonvolatile semiconductor memory device is a random access memory.

5. An image forming apparatus comprising:
a nonvolatile semiconductor memory device including a sensor configured to acquire temperature information about an inside, compare the temperature information acquired by the sensor with a first threshold, and limit access in a case where the acquired temperature information exceeds the first threshold;
a printer configured to print an image on a sheet based on print data; and
a controller having one or more processors which execute instructions stored in one or more memories, the controller being configured to:
cause the nonvolatile semiconductor memory device to store print data;
acquire the temperature information from the nonvolatile semiconductor memory device; and
compare the acquired temperature information with a second threshold lower than the first threshold,
wherein the controller causes, based on the temperature information at or above the second threshold, the nonvolatile semiconductor memory device to store print data in a first operation and cause the printer to perform printing based on the print data stored in the first operation, and
wherein the controller causes, based on the temperature information below the second threshold, the nonvolatile semiconductor memory device to store print data in a second operation and cause the printer to perform printing based on the print data stored in the second operation.

6. The apparatus according to claim 5,
wherein the first operation is only a write operation, and
wherein the second operation is a write-verify operation.

7. The apparatus according to claim 1,
wherein limiting the access reduces a frequency of access to the nonvolatile semiconductor memory device.

8. The apparatus according to claim 1, further comprising:
a receiving IF configured to receive a job,
wherein the controller acquires the temperature information about the nonvolatile semiconductor memory device in response to receiving the job through the receiving IF.

9. The apparatus according to claim 1, further comprising:
a receiving IF configured to receive a job including print data, wherein the controller sets the second threshold in response to receiving the job through the receiving IF.

10. The apparatus according to claim 8,
wherein the controller acquires the temperature information in response to receiving print data of one page included in the job through the receiving IF.

11. The apparatus according to claim 1, wherein the nonvolatile semiconductor memory device is a solid-state drive.

12. The apparatus according to claim 1, wherein the nonvolatile semiconductor memory device includes a volatile storage area and a nonvolatile semiconductor storage area, and when print data is stored in the nonvolatile semiconductor memory device stores, the print data is stored in the volatile storage area and the print data stored in the volatile storage area is stored in the nonvolatile semiconductor storage area.

* * * * *